(No Model.) 3 Sheets—Sheet 2.

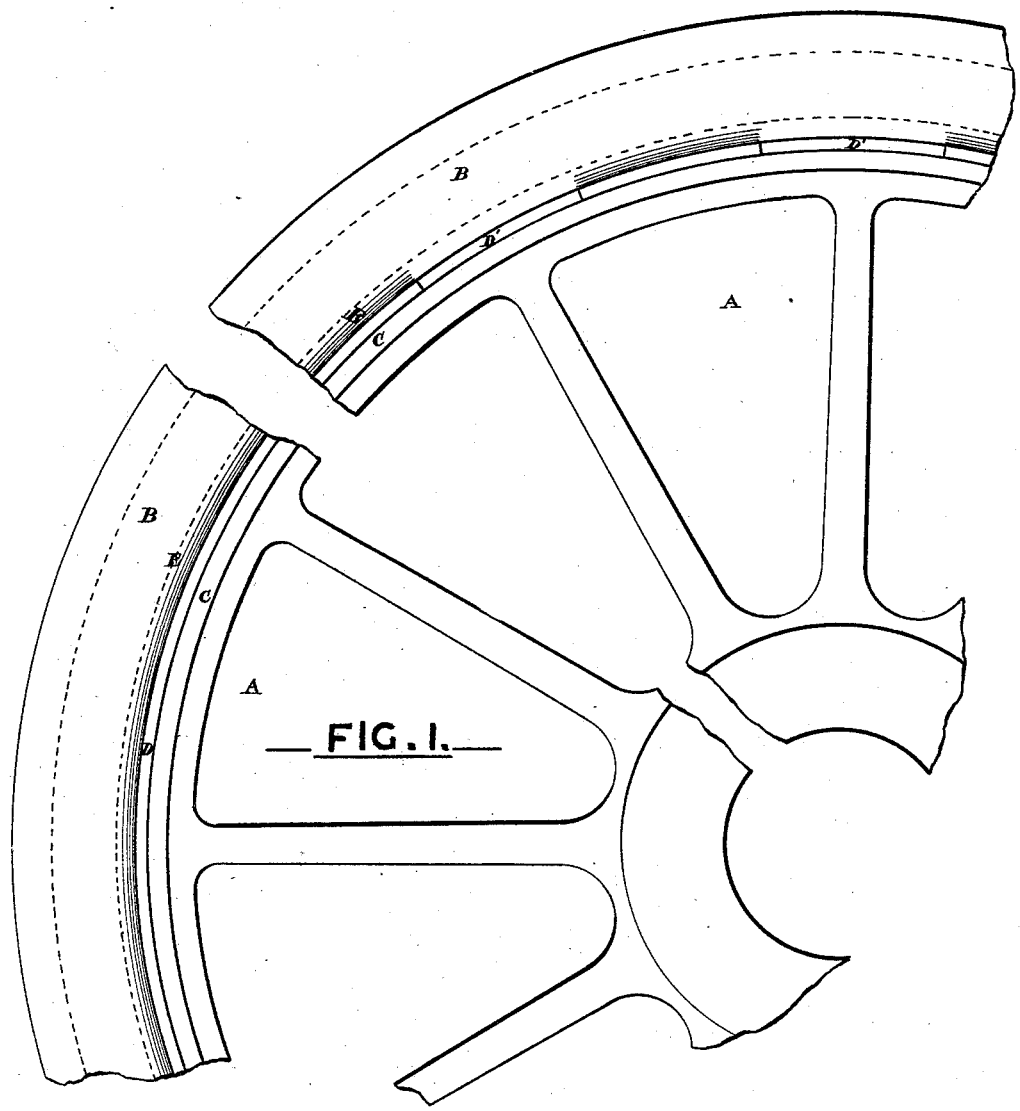

S. CARLTON.
CAR WHEEL.

No. 305,287. Patented Sept. 16, 1884.

(No Model.) 3 Sheets—Sheet 3.

S. CARLTON.
CAR WHEEL.

No. 305,287. Patented Sept. 16, 1884.

Witnesses
J. H. Blackwood
R. G. Du Bois

Inventor
Samuel Carlton
by W. W. Doolittle
Attorney

N. PETERS, Photo-Lithographer, Washington, D. C.

UNITED STATES PATENT OFFICE.

SAMUEL CARLTON, OF NEW SWINDON, COUNTY OF WILTS, ENGLAND.

CAR-WHEEL.

SPECIFICATION forming part of Letters Patent No. 305,287, dated September 16, 1884.

Application filed April 3, 1884. (No model.) Patented in England May 3, 1875, No. 1,630; in Victoria June 11, 1883, No. 3,479, and in Belgium June 28, 1883, No. 61,862.

*To all whom it may concern:*

Be it known that I, SAMUEL CARLTON, a subject of the Queen of Great Britain and Ireland, residing at New Swindon, in the county of Wilts, Kingdom of Great Britain and Ireland, have invented new and useful Improvements in the Construction of Tire-Fastenings, (for which I have obtained patents in Great Britain, No. 1,630, bearing date May 3, 1875; in Belgium, No. 61,862, bearing date June 28, 1883, and in Victoria, No. 3,479, bearing date June 11, 1883,) of which the following is a specification.

The object of this invention is to so connect the tires with the rims of the wheels of engines, carriages, or other rolling stock of railways, or of other similar vehicles, as to prevent such tires dropping off or leaving the wheels in case of a breakage, or running loose upon or in any manner moving away from the wheels to which they are fixed, thereby occasioning accidents or casualties calculated to involve injury to or loss of life and property.

My invention consists for this purpose in the combination, with the wheel-rim and tire, of a key-ring and an annular device constructed in one or more parts, and so applied as to fix said key-ring, as hereinafter described. The key-ring is made of iron or other suitable metal, with two annular lips or lugs, formed so that the one shall fit into a corresponding recess or groove in the tire and the other into a like recess in the rim of the wheel proper, these lips or lugs and the recesses or grooves into which they fit being either straight or beveled, as the occasion may require.

Figure 1 of the drawings is part of a side view of a wheel in which a key-ring constructed according to my invention is fixed in its place by means of an annular wedge-shaped key, A being the rim and body of the wheel, B the tire, C the key-ring, and D the wedge-shaped key. Fig. 2 is part of a side view of a similar wheel, in which the annular wedge-shaped key is made in segments.

Figure 3:
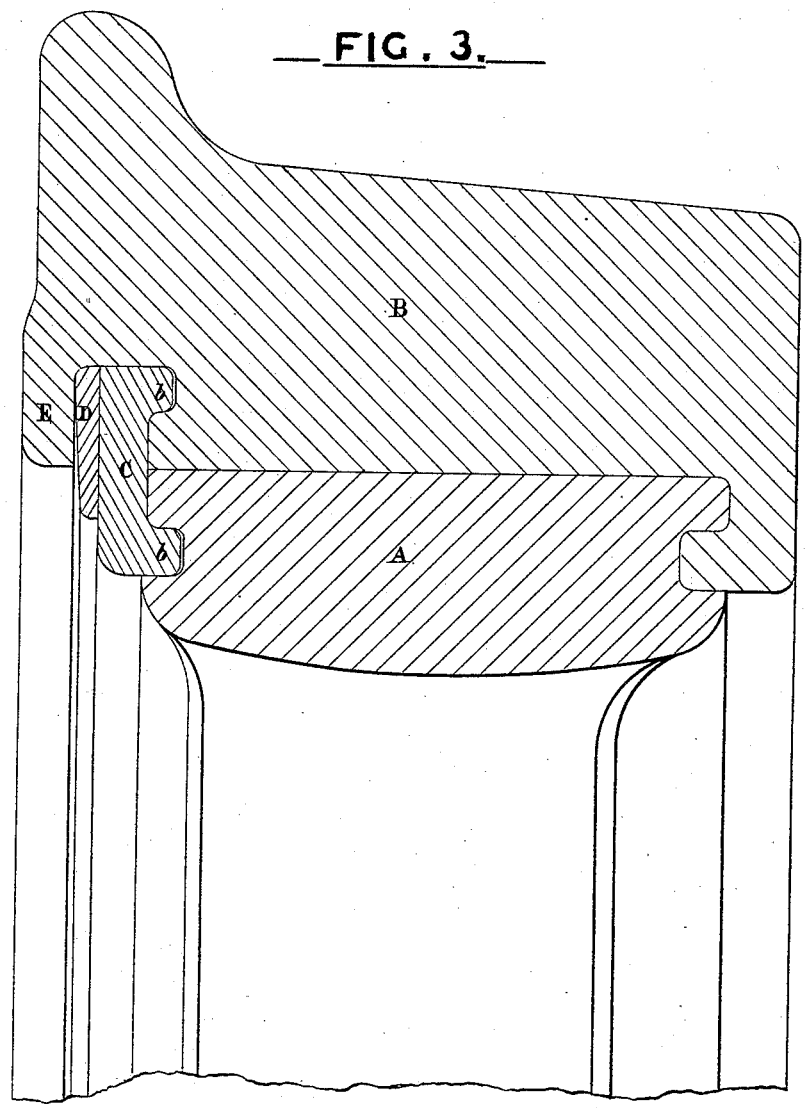
Figure 4:
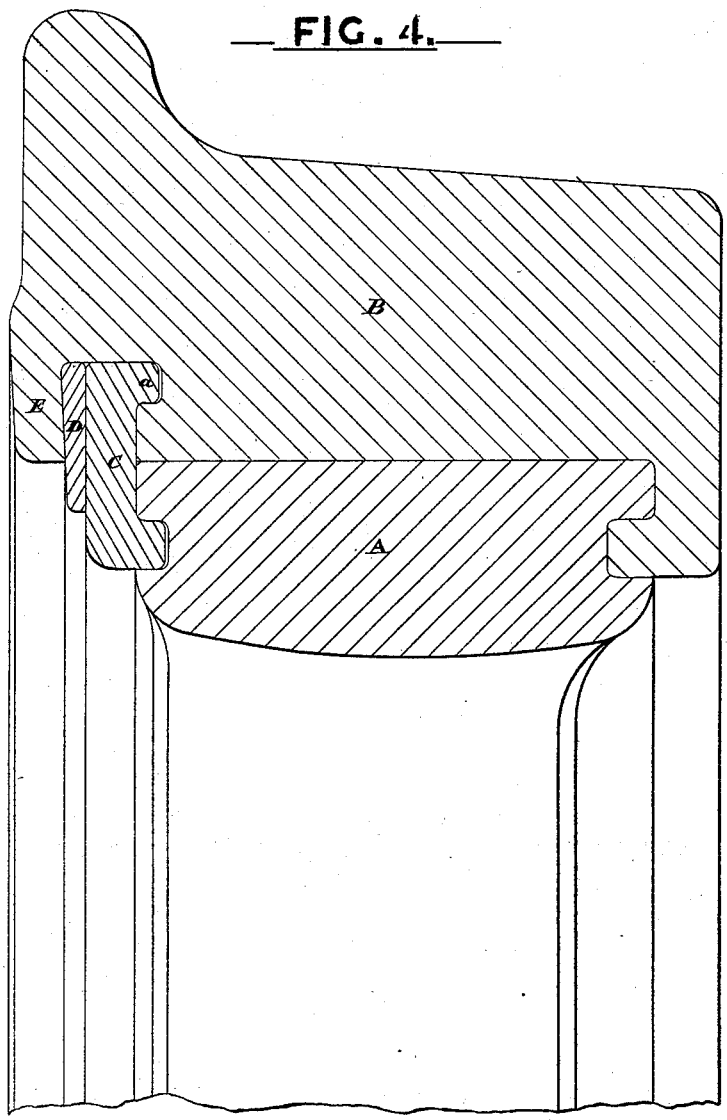

In Figs. 3 and 4 I have shown, on an enlarged scale, two cross-sections of a tire and rim joined together by means of a key-ring, C, constructed according to my invention, and furnished with two lips, *a b*, entering into corresponding recesses made in the tire and rim, respectively, and fastened by means of an annular wedge made in one piece, or composed of a series of segmental pieces, D, the same being shown in Fig. 3 in the position occupied when first inserted between the rim-lap E and the key-ring C, and in Fig. 4 with the lap E of the tire hammered or fullered thereon, so that when said lap is hammered down upon the side of the wedge it cannot become loosened by the constant jarring to which it is subjected, thus overcoming the difficulty experienced with keys of rectangular form.

The wedge D is shown beveled in Figs. 3 and 4, with the thick end entered first; but flat section of annulus (single or compound) may be substituted therefor and retained in place by means of bolts, pins, rivets, or similar appliances.

Having described my said invention, I wish it to be understood that I do not claim the use of rings for securing tires to wheels; neither do I claim the use of wedges for such purpose, both of these appliances having been in use before my invention; but What I do claim is—

A tire-fastening consisting of an annular wedge-shaped key, D, in one or more parts, and a key-ring, C, in combination with a grooved rim and recessed tire provided with the lap E, whereby said tire is securely held in place upon hammering or bending the said lap against the said key, in the manner described.

SAMUEL CARLTON.

Witnesses:
WILLIAM M. KEMP,
41 *Broad Street, Bristol, Accountant.*
ARTHUR E. CHAPMAN,
1 *St. Vincents Terrace, Hotwells, Bristol, Solicitor's Clerk.*